(12) United States Patent
Miyamoto et al.

(10) Patent No.: US 10,026,951 B2
(45) Date of Patent: Jul. 17, 2018

(54) CONTROL SYSTEM AND CONTROL METHOD

(71) Applicants: YOKOGAWA ELECTRIC CORPORATION, Tokyo (JP); TORAY ENGINEERING CO., LTD., Tokyo (JP)

(72) Inventors: Hiroyuki Miyamoto, Tokyo (JP); Takashi Sasaki, Tokyo (JP); Atsushi Watanabe, Numazu (JP); Kazushige Nakashima, Numazu (JP); Yohei Nishimatsu, Otsu (JP); Kenji Kitajima, Otsu (JP)

(73) Assignees: Yokogawa Electric Corporation, Tokyo (JP); TORAY ENGINEERING CO., LTD., Tokyo (JP)

( * ) Notice: Subject to any disclaimer, the term of this patent is extended or adjusted under 35 U.S.C. 154(b) by 178 days.

(21) Appl. No.: 14/787,001

(22) PCT Filed: Mar. 5, 2014

(86) PCT No.: PCT/JP2014/055617
§ 371 (c)(1),
(2) Date: Oct. 26, 2015

(87) PCT Pub. No.: WO2014/174908
PCT Pub. Date: Oct. 30, 2014

(65) Prior Publication Data
US 2016/0111708 A1    Apr. 21, 2016

(30) Foreign Application Priority Data
Apr. 26, 2013   (JP) .................................. 2013-094668

(51) Int. Cl.
B05C 5/02      (2006.01)
B05C 11/10     (2006.01)
H01M 4/04      (2006.01)

(52) U.S. Cl.
CPC ............. *H01M 4/0402* (2013.01); *B05C 5/02* (2013.01); *B05C 5/0254* (2013.01);
(Continued)

(58) Field of Classification Search
None
See application file for complete search history.

(56) References Cited

U.S. PATENT DOCUMENTS

| 3,056,383 | A | * | 10/1962 | Woock | ...................... B01F 5/10 |
| | | | | | 118/112 |
| 2006/0163759 | A1 | * | 7/2006 | Maruyama | ................ B05C 5/02 |
| | | | | | 261/137 |

(Continued)

FOREIGN PATENT DOCUMENTS

| CN | 102271825 A | 12/2011 | |
| CN | 102728515 A | * 10/2012 | ............... B05C 5/00 |

(Continued)

*Primary Examiner* — Jethro M Pence
(74) *Attorney, Agent, or Firm* — Sughrue Mion, PLLC

(57) ABSTRACT

The surface profile of a coating material in a substrate width direction is optimized in coating a substrate with the coating material such as an electrode active material. A gap adjuster configured to adjust a gap between a nozzle for ejecting a coating material and a substrate to be coated with the coating material, a rotation speed adjuster configured to adjust a rotation speed of a pump for pressure-feeding the coating material to the nozzle, a model calculator configured to calculate a surface profile of the coating material based on an end region model and a central region model wherein the end region model models profiles of rising regions in the surface profile of the coating material in a width direction of the substrate and the central region model models a profile (Continued)

of a central region between the rising regions in the surface profile, a comparator configured to compare a predetermined set profile with the surface profile of the coating material calculated by the model calculator, and a control calculator configured to calculate a control amount of at least one of the gap adjuster and the rotation speed adjuster based on a comparison result of the comparator are included.

11 Claims, 12 Drawing Sheets

(52) U.S. Cl.
CPC ...... *B05C 11/1005* (2013.01); *B05C 11/1023* (2013.01); *H01M 4/0419* (2013.01)

(56) References Cited

U.S. PATENT DOCUMENTS

| | | | |
|---|---|---|---|
| 2007/0248745 A1* | 10/2007 | Wakai | B05C 11/1005 427/10 |
| 2011/0249276 A1 | 10/2011 | Minakuchi | |
| 2012/0148727 A1 | 6/2012 | Heo et al. | |

FOREIGN PATENT DOCUMENTS

| | | |
|---|---|---|
| JP | 7-85788 B2 | 9/1995 |
| JP | 3680985 B2 | 8/2005 |
| JP | 2012-9297 A | 1/2012 |
| JP | 4989909 B2 | 8/2012 |
| KR | 10-2012-0065682 A | 6/2012 |

* cited by examiner

CONTROL SYSTEM AND CONTROL METHOD

TECHNICAL FIELD

The present invention relates to a control system and a control method that are used to coat a substrate with a coating material such as an electrode active material.

Priority is claimed on Japanese Patent Application No. 2013-094668, filed Apr. 26, 2013, the content of which is incorporated herein by reference.

BACKGROUND ART

When a substrate, which is in a shape of a band or the like, is continuously coated with a paste-like coating material while the substrate is conveyed, there are some cases where it is necessary to accurately adjust a weight (that is, a coating weight) per unit area of the coating material attached to the substrate. For example, in a battery sheet electrode manufacturing apparatus, since a weight per unit area of an electrode active material with which a collector sheet as a substrate is coated affects performance of a secondary battery, it is necessary to accurately adjust the weight per unit area of the electrode active material. In view of the quality of a secondary battery, it is important to match coating end positions of the electrode active material with which both the front and rear surfaces of the substrate are coated with each other. Accordingly, it is necessary to accurately adjust the coating end positions. From the viewpoint of productivity, it is necessary to match the coating end position with a set value for a time as short as possible from a start of the coating.

For example, Patent Literatures 1 to 3 describe a coating machine which includes a backup roll supporting a substrate and a die coater disposed opposite to the backup roll so as to eject an electrode active material and which adjusts an amount of electrode active material ejected by adjusting a rotation speed of a pump pressure-feeding the electrode active material to the die coater or a gap between the die coater and the substrate and thus adjusts a weight (that is, a coating weight) per unit area of the electrode active material to match a set value.

Patent Literatures 1 to 3 describe adjustment of the coating weight, but fails to describe, for example, adjustment of the rising profiles of ends of the electrode active material in a substrate width direction or the profile of a central region between the ends. That is, a technique of focusing on a surface profile in a substrate width direction of a coating material such as an electrode active material and adjusting to optimize the surface profile has not been proposed yet.

In order to achieve further improvement in the performance of a secondary battery, it is considered that it is necessary to adjust coating conditions including a coating weight of an electrode active material and end positions thereof with higher accuracy. Accordingly, there is necessity for adjusting coating conditions of a coating material including the surface profile thereof.

CITATION LIST

Patent Literature

[Patent Literature 1]
Japanese Examined Patent Application Publication No. H7-85788

[Patent Literature 2]
Japanese Patent No. 3680985

[Patent Literature 3]
Japanese Patent No. 4989909

SUMMARY OF INVENTION

Technical Problem

An aspect of the present invention optimizes a surface profile of a coating material in a substrate width direction in coating a substrate with the coating material such as an electrode active material.

Solution to Problem

An aspect of the present invention may employ the following configurations.

A first invention is a control system, and the control system may employ a configuration in which a gap adjuster configured to adjust a gap between a nozzle for ejecting a coating material and a substrate to be coated with the coating material, a rotation speed adjuster configured to adjust a rotation speed of a pump for pressure-feeding the coating material to the nozzle, a model calculator configured to calculate a surface profile of the coating material based on an end region model and a central region model wherein the end region model models profiles of rising regions in the surface profile of the coating material in a width direction of the substrate and the central region model models a profile of a central region between the rising regions in the surface profile, a comparator configured to compare a predetermined set profile with the surface profile of the coating material calculated by the model calculator, and a control calculator configured to calculate a control amount of at least one of the gap adjuster and the rotation speed adjuster based on a comparison result of the comparator are included.

According to the aspect of the present invention, the surface profile of the coating material in the width direction of the substrate is expressed by the end region model and the central region model, and the surface profile can be acquired by performing the calculation based on the end region model and the central region model. Since the surface profile acquired by the calculation indicates the surface profile of the actually-coated coating material, the difference between the surface profile of the actually-coated coating material and the set profile (that is, the comparison result) can be acquired by comparing the surface profile acquired by the calculation with the set profile. In addition, in the aspect of the present invention, the gap between the substrate and the nozzle ejecting the coating material and the rotation speed of the pump pressure-feeding the coating material to the nozzle are adjusted based on the difference.

A second invention may employ a configuration in which, in the first invention, the model calculator is configured to calculate end positions of the coating material based on the end region model, and the comparator is configured to compare end positions of the set profile with the end positions calculated by the model calculator.

A third invention may employ a configuration in which, in the first or second invention, the gap adjuster is configured to independently adjust the gap at one end region and the gap at the other end region in the width direction of the substrate, and the model calculator is configured to calculate the end positions, a slope of the central region, and an average coating weight of the central region as values indicating the surface profile based on the end region model and the central region model.

A fourth invention may employ a configuration in which, in the third invention, the central region model is expressed by a linear function.

A fifth invention may employ a configuration in which, in the second invention, the model calculator is configured to correct the end positions of the coating material acquired by the calculation based on end positions of the coating material acquired by measurement.

A sixth invention may employ a configuration in which, in the fifth invention, the model calculator is configured to perform linear correction of the end positions of the coating material.

A seventh invention may employ a configuration in which, in one of the first to sixth inventions, a zone actuator adjuster configured to control zone actuators wherein the zone actuators being arranged with respect to the nozzle in the width direction of the substrate and each zone actuator adjusts an amount of the coating material ejected from the nozzle is further included, and the control calculator is configured to calculate control amounts of the gap adjuster, the rotation speed adjuster, and the zone actuator adjuster based on the comparison result of the comparator.

An eighth invention may employ a configuration in which, in one of the first to seventh inventions, the control calculator is configured to calculate the control amount using a steepest descent method associated with the sum of squares of control deviations.

A ninth invention may employ a configuration in which, in one of the first to eighth inventions, the end region model is expressed by a function indicating a Gompertz curve.

A tenth invention may employ a configuration in which, in the ninth invention, the model calculator is configured to calculate parameters included in the function indicating the Gompertz curve using the steepest descent method associated with the square deviation of the profile of the rising region calculated based on the end region model and a measured profile of the rising region, and to calculate the profile of the rising region based on the function indicating the Gompertz curve using the parameters.

An eleventh invention may employ a configuration in which, in the ninth or tenth invention, the model calculator is configured to calculate an inflection point of the Gompertz curve as the end position, and the comparator is configured to compare the end positions of the set profile with the end positions calculated by the model calculator.

A twelfth invention may employ a configuration in which, in the second invention, an end position measure configured to measure actual end positions of the coating material is further included, and the end positions of the coating material calculated by the model calculator are replaced with a measured result of the end position measure.

A thirteenth invention is a control method, and the control method may employ a configuration in which adjusting a gap between a nozzle for ejecting a coating material and a substrate to be coated with the coating material, adjusting a rotation speed of a pump for pressure-feeding the coating material to the nozzle, calculating a surface profile of the coating material based on an end region model and a central region model wherein the end region model models profiles of rising regions in the surface profile of the coating material in a width direction of the substrate and the central region model models a profile of a central region between the rising regions in the surface profile, comparing a predetermined set profile with the calculated surface profile of the coating material, and controlling at least one of the gap and the rotation speed based on the comparison result are included.

Advantageous Effects of Invention

According to the aspect of the present invention, a surface profile is acquired by calculation by performing the calculation using the end region model and the central region model, the difference from the set profile (that is, the comparison result) is acquired by comparing the surface profile acquired by the calculation with the set profile, and the gap between the substrate and the nozzle ejecting the coating material and the rotation speed of the pump pressure-feeding a coating material to the nozzle are adjusted based on the difference. Accordingly, it is possible to optimize the surface profile of a coating material such as an electrode active material in a substrate width direction in coating a substrate with the coating material.

DESCRIPTION OF EMBODIMENTS

Figure 1:
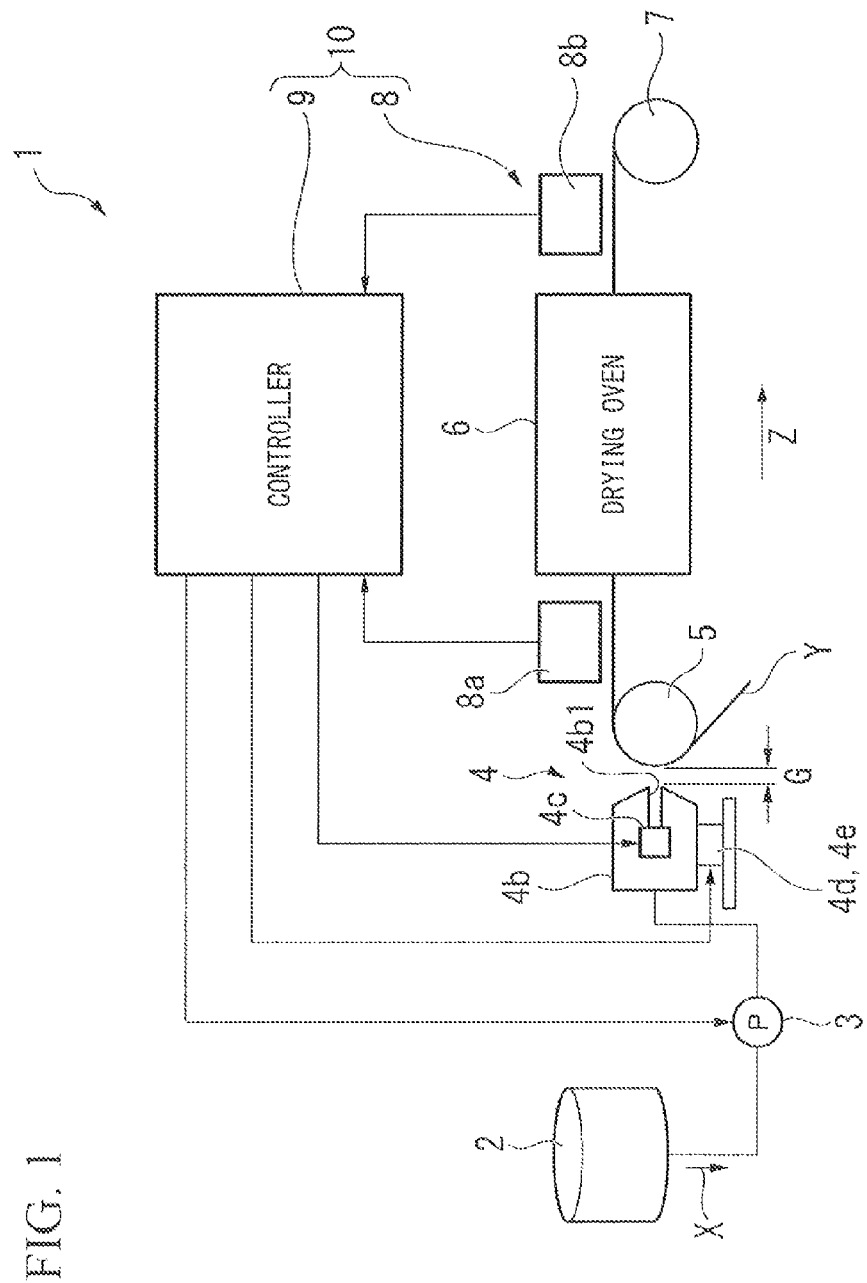
FIG. 1 is a diagram schematically showing a configuration of a battery sheet electrode manufacturing apparatus employing a control system according to an embodiment of the present invention.

Hereinafter, a control system and a control method according to an embodiment of the present invention will be described with reference to the accompanying drawings. In the drawings, the scale of each member is appropriately changed so as to visually recognize each member.

FIG. 1 is a diagram schematically showing a configuration of a battery sheet electrode manufacturing apparatus 1 employing a control system and a control method according to the first embodiment. As shown in FIG. 1, the battery sheet electrode manufacturing apparatus 1 includes a raw material tank 2, a feed pump 3 (pump), a die coater 4, a backup roll 5, a drying oven 6, a winder 7, a measure 8, and a controller 9. Reference sign G denotes a gap between a nozzle disposed in the die coater 4 to eject an electrode active material X and a collector Y (substrate) supported by the backup roll 5. Reference sign Z denotes a conveying direction (flow direction) of the collector Y.

The raw material tank 2 is a container that stores the electrode active material X. The feed pump 3 is connected to the raw material tank 2 and pressure-feeds the electrode active material X stored in the raw material tank 2 to the die coater 4. The feed pump 3 is configured such that a rotation speed thereof can be adjusted by the controller 9 to pressure-feed an amount of electrode active material X corresponding to the rotation speed. The electrode active material X includes a binder in addition to the active material.

Figure 2A:
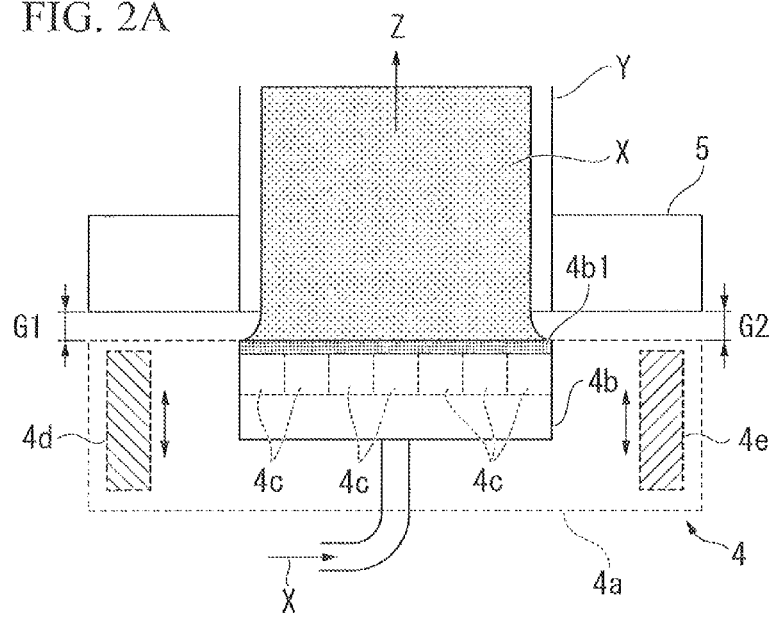
FIG. 2A is an enlarged diagram schematically showing a configuration including a die coater of the battery sheet electrode manufacturing apparatus and showing a single-line coating operation.
Figure 2B:
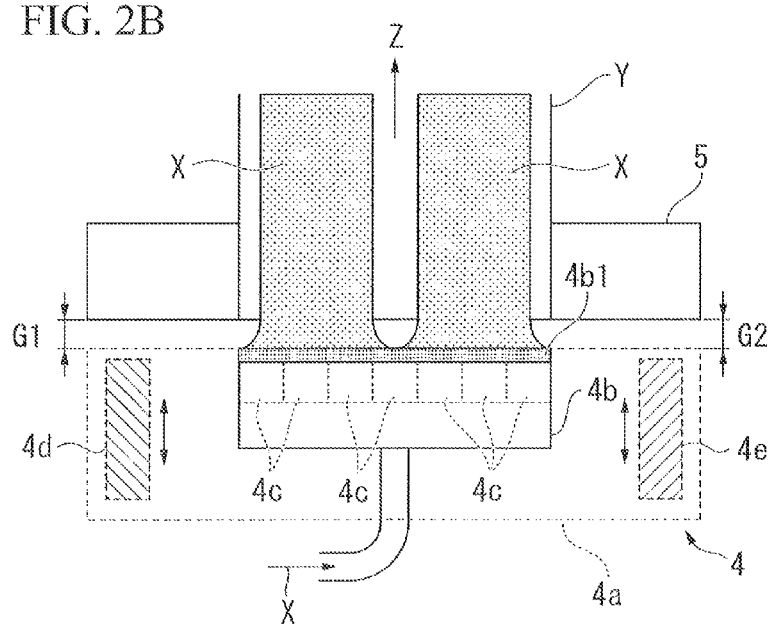
FIG. 2B is an enlarged diagram schematically showing a configuration including a die coater of the battery sheet electrode manufacturing apparatus and showing a two-line coating operation.

FIG. 2A is an enlarged diagram schematically showing a configuration including the die coater 4. As shown in FIG. 2A, the die coater includes a pedestal 4a, a die 4b, zone actuators 4c, a left driver 4d, and a right driver 4e. The pedestal 4a supports the die 4b. The die 4b is disposed opposite to the backup roll 5 and has a slit 4b1 extending in the width direction of the collector Y (substrate) supported by the backup roll 5. The die 4b ejects the electrode active material X pressure-fed from the feed pump 3 toward the collector Y via the slit 4b1. In the first embodiment, the die 4b having the slit 4b1 from which the electrode active material X is ejected functions as a nozzle ejecting a coating material. The die coater 4 performs a single-line coating operation using a single coater in the flow direction in a normal state as shown in FIG. 2A, but may perform a multi-line coating operation using two or more coaters as shown in FIG. 2B by disposing a shim (spacer) at an appropriate position of the slit 4b1. The control system and the control method according to an embodiment of the present invention are applicable to any of the single-line coating and the multi-line coating.

Plural zone actuators 4c are arranged along the slit 4b1 of the die 4b as shown in FIG. 2A. The zone actuators 4c are arranged without any clearance and adjust an amount of electrode active material X ejected from the slit 4b1 in zones in which each zone actuator 4c is disposed under the control of the controller 9.

The left driver 4d moves the pedestal 4a supporting the die 4b in the normal direction of the surface of the collector Y supported by the backup roll 5 and is disposed in the vicinity of the left end of the die coater 4 when the backup roll 5 is viewed from the die coater 4 as shown in FIG. 2A. The left driver 4d includes, for example, a motor of which a rotation is controlled by the controller 9 and a rack and pinion which transmits power of the motor to the pedestal 4a. The right driver 4e has the same configuration as the left driver 4d and is disposed in the vicinity of the right end of the die coater 4 as shown in FIG. 2A.

The left driver 4d and the right driver 4e move the die 4b supported by the pedestal 4a closer to or away from the collector Y by moving the pedestal 4a closer to or away from the collector Y under the control of the controller 9. The left driver 4d and the right driver 4e can be independently driven by the controller 9, the left driver 4d adjusts a left gap G1 shown in FIG. 2A, and the right driver 4e adjusts a right gap G2 shown in FIG. 2A.

The backup roll 5 supports a band-like collector Y fed between a feeder not shown and the winder 7 at a middle position and is disposed opposite to the die 4b of the die coater 4 in a state in which an axis thereof is set to be horizontal. As shown in FIG. 1, the drying oven 6 is disposed in a stage subsequent to the backup roll 5, and evaporates moisture included in the electrode active material X to fix the electrode active material X to the collector Y by drying the electrode active material X with which the collector Y has been coated. The winder 7 winds and recovers the collector Y which has been dried by the drying oven 6.

The measure 8 includes a thickness meter 8a and an end position measuring apparatus 8b (end position measure). As shown in FIG. 1, the thickness meter 8a is disposed between the backup roll 5 and the drying oven 6 and measures a weight per unit area of the electrode active material X with which the collector Y has been coated. As the thickness meter 8a, for example, an X-ray thickness meter or a β-ray thickness meter which measures a weight distribution in the width direction of the electrode active material X while reciprocating in the width direction of the collector Y can be used. The weight per unit area of the electrode active material X corresponds to a coating weight of the electrode active material X. Accordingly, the thickness meter 8a may be said to measure a coating weight distribution in the width direction of the collector Y. The end position measuring apparatus 8b is disposed between the drying oven 6 and the winder 7 and measures end positions of the electrode active material X with which the collector Y has been coated. The end position measuring apparatus 8b calculates the end positions of the electrode active material X, for example, by imaging the electrode active material X on the substrate Y and processing an image as the imaging result. The thickness meter 8a and the end position measuring apparatus 8b are connected to the controller 9 and input the measured results into the controller 9. The end position measuring apparatus 8b is auxiliary and may not be employed.

The controller 9 is connected to the feed pump 3 and the left driver 4d and the right driver 4e of the die coater 4. The controller 9 is connected to each zone actuator 4c of the die coater 4. Although details of the controller 9 will be described below, the controller 9 adjusts the rotation speed of the feed pump 3 and the gap between the die 4b and the collector Y based on the measured results of the measure 8 such that the surface profile of the electrode active material X with which the collector Y is coated satisfies a predetermined set value.

The control system 10 according to the first embodiment is constituted by the measure 8 and the controller 9 and is introduced into the battery sheet electrode manufacturing apparatus 1 to control the conditions of coating the collector Y with the electrode active material X.

In the battery sheet electrode manufacturing apparatus 1 having the above-mentioned configuration, the electrode active material X contained in the raw material tank 1 is fed to the die coater 4 by the feed pump 3 and the electrode active material X is ejected onto the surface of the collector Y from the slit 4b1 formed in the die 4b while an amount of electrode active material X ejected is adjusted by each zone actuator 4c. The collector Y is conveyed between a feeder not shown and the winder 7 and is coated with the electrode active material X at a position opposite to the slit 4b1 of the die 4b. The collector Y coated with the electrode active material X is dried in the drying oven 6 and is then wound and recovered as a battery sheet electrode on the winder 7.

The control system 10 according to the first embodiment will be described below in more detail with reference to FIGS. 3 to 13. In the following description, a coating profile refers to a surface profile of the electrode active material X which is acquired by measurement, and a calculated profile refers to a surface profile of the electrode active material X which is calculated by calculation using a model (a central region model and an end region model).

Figure 3:
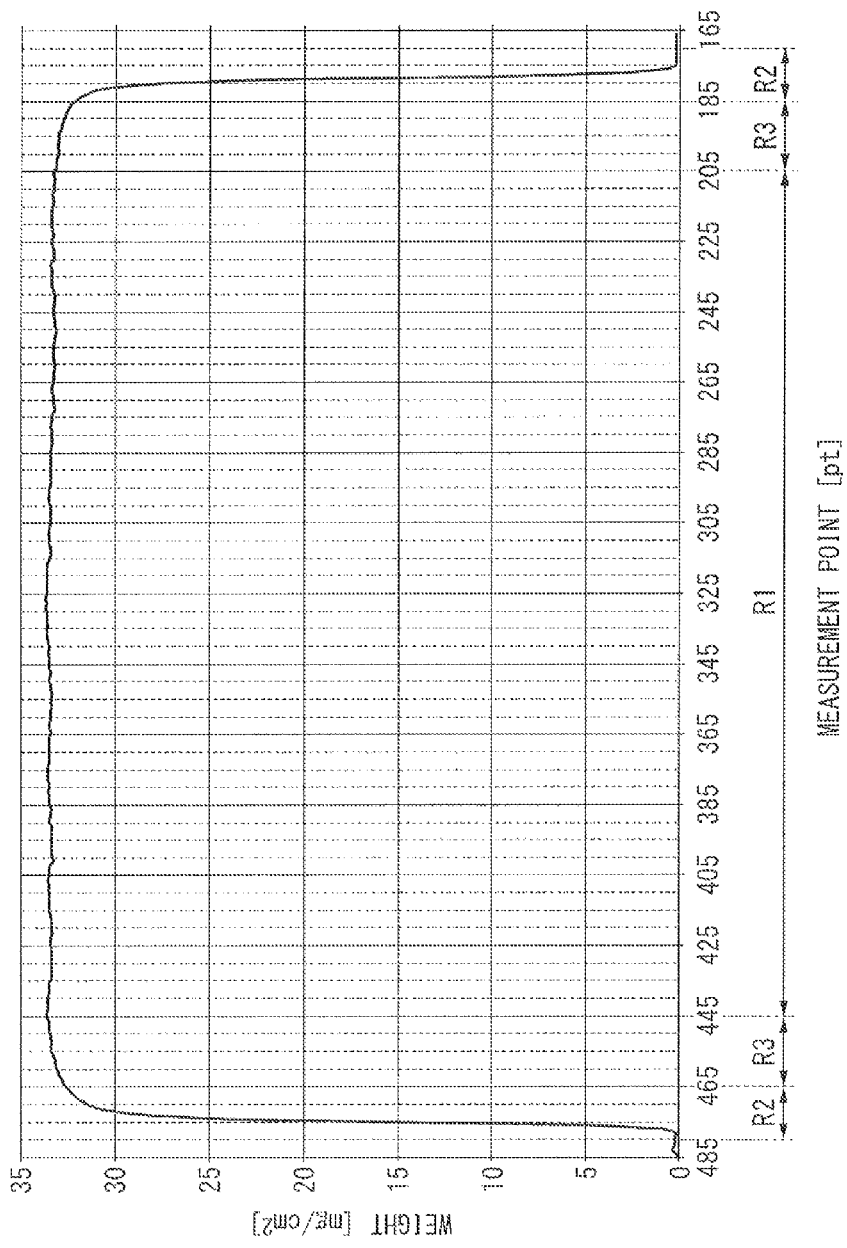
FIG. 3 is a graph showing a measured result of an electrode active material by a thickness meter.

FIG. 3 is a graph showing the measured result from the thickness meter 8a when the collector Y is actually coated with the electrode active material X, where the horizontal axis represents a measurement point in the width direction of the collector Y and the vertical axis represents the weight (that is, the coating weight). The measured result by the thickness meter 8a is the coating weight at each measurement point and thus the graph shown in FIG. 3 may be said to indicate the surface profile of the electrode active material X in the width direction of the collector Y.

The control system 10 according to the first embodiment is characterized in that the surface profile of the electrode active material X is modeled. In this modeling, as shown in FIG. 3, the surface profile is considered to be divided into a central region R1 in which the weight distribution is flat, rising regions R2 in which the weight rapidly increases, and intermediate regions R3 connecting the central region R1 to the rising regions R2. The intermediate regions R3 are modeled using a function for linearly interpolating end positions of the central region R1 and end positions of the rising regions R2 and are not necessary. In this way, in the control system 10 according to the first embodiment, the surface profile of the electrode active material X is divided into the rising regions R2 at both end portions and the central region R1 between the rising regions R2.

When a response of the central region R1 when the control of only the left gap G1 shown in FIG. 2 is independently performed is defined as $y_l(i)$, a response of the central region R1 when the control of only the right gap G2 shown in FIG. 2 is independently performed is defined as $y_r(i)$, a response of the central region R1 when the control of the left gap G1 and the control of the right gap G2 are simultaneously performed is defined as $y_c(i)$, and i=1, 2, . . . , N denotes a total of N data sample points, $y_l(i)$, $y_r(i)$, and $y_c(i)$ may be modeled using the following Expressions (1) to (3).

$$y_l(i) = \frac{-K_l}{(1-\alpha)N} \cdot \{i - ((1-\alpha)N + 1)\} \cdot dG_l \quad (1)$$

$$y_r(i) = \frac{K_r}{(1-\alpha)} \cdot (i - \alpha N) \cdot dG_r \quad (2)$$

$$y_c(i) = y_r(i) + y_l(i) \quad (3)$$

In Expressions (1) to (3), $dG_r$ denotes a change amount of right gap controlled [m], $dG_l$ denotes a change amount of left gap controlled [μm], $K_r$ denotes a process gain [(mg/cm²)/μm] of the response of the central region R1 to the change of the right gap controlled, $K_l$ denotes a process gain [(mg/cm²)/μm] of the response of the central region R1 to the change of the left gap controlled, N denotes a central region response width [pt], and α denotes the response ratio.

Figure 4A:
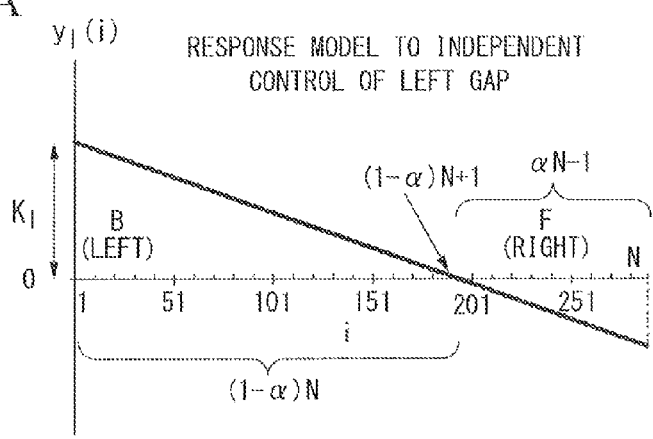
FIG. 4A shows a response model when control of only a left gap is independently performed.
Figure 4B:
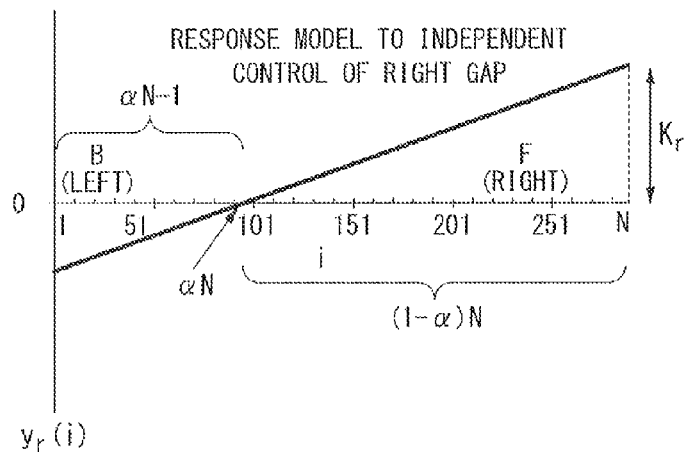
FIG. 4B shows a response model when control of only a right gap is independently performed.
Figure 4C:
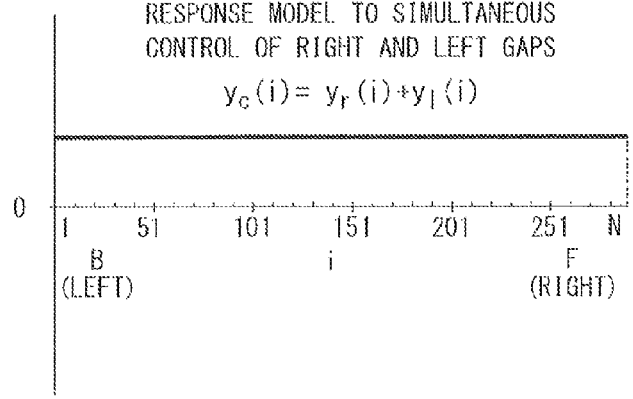
FIG. 4C shows a response model in which the response models shown in FIGS. 4A and 4B are superimposed.

As represented in Expressions (1) to (3), the response when the control of the left gap G1 and the control of the right gap G2 are simultaneously performed can be shown as the superimposition of the responses when the control of the left gap G1 and the control of the right gap G2 are independently performed, and has linearity. That is, when the response model when the control of only the left gap G1 is independently performed as shown in FIG. 4A and the response model when the control of only the right gap G2 is independently performed as shown in FIG. 4B are superimposed, a model having linearity shown in FIG. 4C can be obtained and the response model shown in FIG. 4C is the response model when the control of the left gap G1 and the control of the right gap G2 are simultaneously performed.

Next, it can be seen through experiments that a proportional relationship is established between the change amount of gap controlled when the control of the left gap G1 and the control of the right gap G2 are simultaneously performed and an average coating weight of the central region R1. Accordingly, a change rate of the average coating weight is a value obtained by multiplying a unit change rate of the change amount of gap controlled by a change amount of gap actually controlled.

It can be seen through experiments that a proportional relationship is established between a change amount of pump rotation speed controlled and the average coating weight of the central region R1. Accordingly, a change rate of the average coating weight is a value obtained by multiplying a unit change rate of the change amount of pump rotation speed controlled by a change amount of pump rotation speed actually controlled.

Therefore, when the change of the average coating weight of the central region R1 is defined as dA, dA can be modeled by the following Expression (4).

$$dA = K_g \cdot dG + K_p \cdot dP \quad (4)$$

In Expression (4), dG denotes a change amount of gap simultaneously controlled [μm], dP denotes a change amount of pump rotation speed controlled [%], $K_g$ denotes a process gain [%/μm] of the change of the average coating weight of the central region R1 with respect to the change amount of gap simultaneously controlled, and $K_p$ denotes a process gain [%/%] of the change of the average coating weight of the central region R1 with respect to the change amount of pump rotation speed controlled.

In the relationships between Expressions (1) to (3) and Expression (4), $K_g$ is obtained from Expressions (1) to (3).

When $K_r = K_l = K$ and $dG_r = dG_l = dG$ are set, the following Expressions (5) and (6) can be obtained as follows.

$$y_c(i) = y_r(i) + y_l(i) \tag{5}$$

$$= \frac{K}{(1-\alpha)N} \cdot (i - \alpha N) \cdot dG + \frac{-K}{(1-\alpha)N} \cdot \{i - ((1-\alpha)N + 1)\} \cdot dG$$

$$= \frac{K}{(1-\alpha)N}\{(1-2\alpha)N + 1\} \cdot dG$$

$$K_g = \frac{K}{(1-\alpha)N}\{(1-2\alpha)N + 1\} \tag{6}$$

When a response of the rising region R2 when the control of the left gap G1 and the control of the right gap G2 are independently or simultaneously performed or the feed pump 3 is operated is defined as $y_b(k)$ and $k = -n, -n+1, \ldots, -1, 0, 1, \ldots, n-1$, n denotes a total of 2n+1 data sample points, $y_b(k)$ can be modeled by a function indicating a Gompertz curve of the following Expression (7).

$$y_b(k) = a \cdot b^{exp(-c \cdot k)} \tag{7}$$

Here, a>0, 0<b<1, and c≠0 are parameters by which a coating profile is characterized, a determines an upper limit of the coating profile, b determines a position of the coating profile relative to the horizontal axis, and c determines an inclination of the coating profile. By adjusting the parameters a, b, and c, the curve drawn by Expression (7) can be changed. Accordingly, by appropriately adjusting the parameters a, b, and c, the curve drawn by Expression (7) can be actually approximated to the profile of the rising region R2 of the electrode active material X.

Figure 5A:
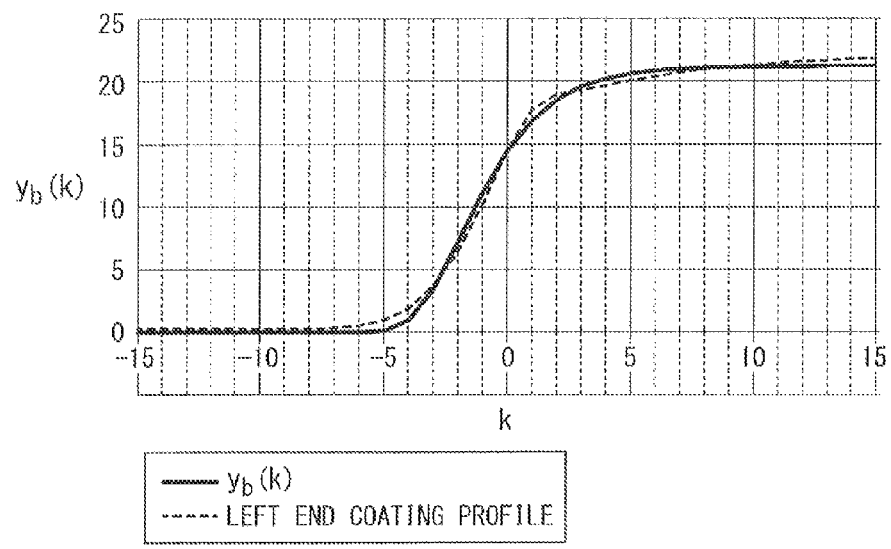
FIG. 5A is an illustration diagram showing an actual coating profile and a calculated result in a rising region located at the leftmost end when a collector is coated with three lines of electrode active materials and the control of the left gap and the control of the right gap are simultaneously performed.
Figure 5B:
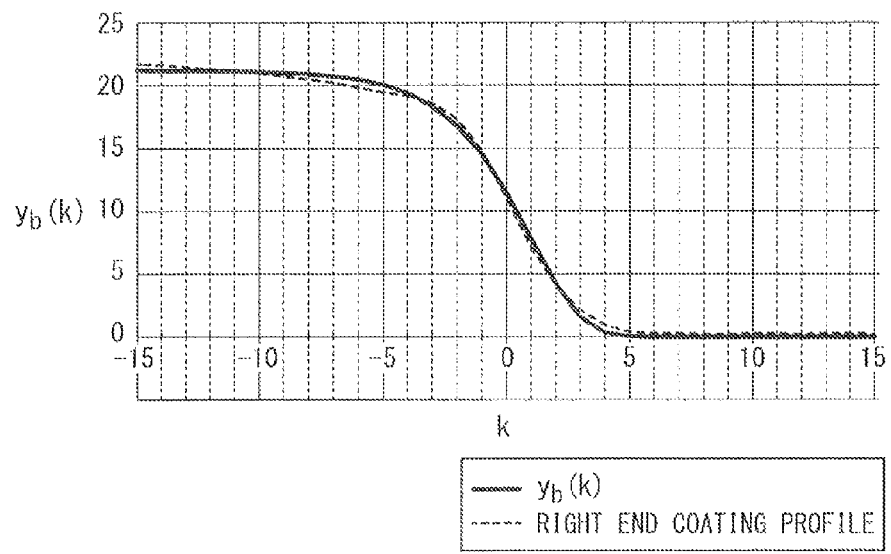
FIG. 5B is an illustration diagram showing an actual coating profile and a calculated result in a rising region located at the rightmost end under the similar conditions to in FIG. 5A.

The actual coating profile in the rising region R2 located at the leftmost end when the collector Y is coated in three lines with the electrode active material X and the control of the left gap G1 and the control of the right gap G2 are simultaneously performed and the calculated result of Expression (7) are shown in FIG. 5A, and the actual coating profile in the rising region R2 located at the rightmost end and the calculated result of Expression (7) under the same conditions are shown in FIG. 5B. In FIG. 5A, c>0 is satisfied and in FIG. 5B, c<0 is satisfied. As shown in FIGS. 5A and 5B, it can be seen that the actual coating profile and the result indicated by the model using the Gompertz curve substantially match In the Gompertz curve, one inflection point is present in the curve. The change of the inflection point position is examined by independently or simultaneously performing the control of the left gap G1 and the control of the right gap G2 from the initial state. As a result, it can be seen that the superimposition of the change of the inflection point position when the control of the left gap G1 is independently performed and the change of the inflection point position when the control of the right gap G2 is independently performed substantially matches the change of the inflection point position when the control of the left gap G1 and the control of the right gap G2 are simultaneously performed.

Figure 6A:
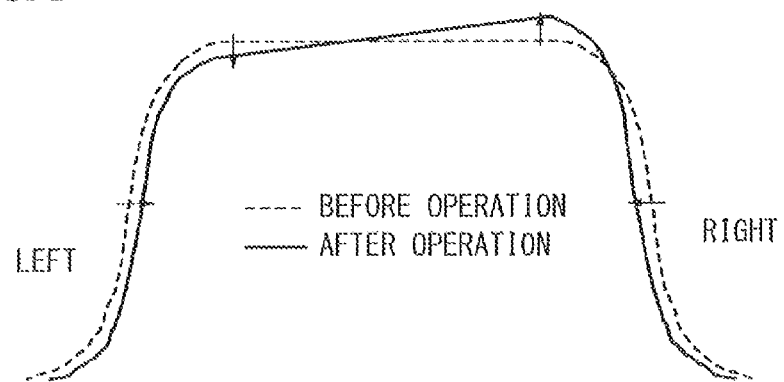
FIG. 6A is a diagram schematically showing a variation of a surface profile when only the right gap is enlarged.
Figure 6B:
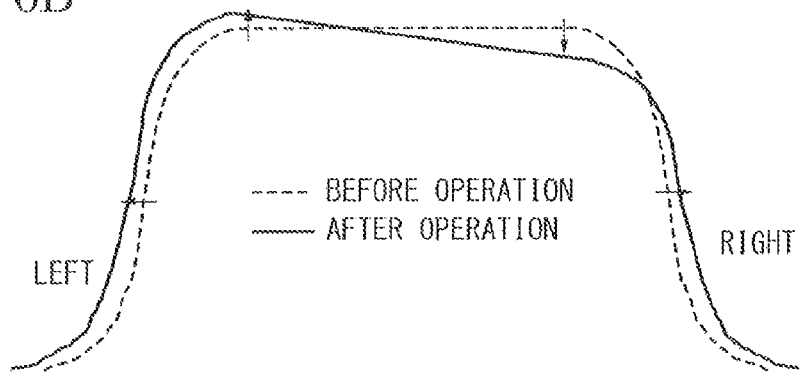
FIG. 6B is a diagram schematically showing a variation of the surface profile when only the right gap is narrowed.

Based on these results, for example, the coating profile when only the right gap G2 is enlarged is inclined such that both rising regions R2 approach each other, the right part of the central region R1 is raised, and the left part thereof is lowered as shown in FIG. 6A. The coating profile when only the right gap G2 is narrowed is inclined such that both rising regions R2 further separate from each other, the left part of the central region R1 is raised, and the right part thereof is lowered as shown in FIG. 6B. When the control of only the left gap G1 is performed, the coating profile is changed in the same way except that the inclination direction of the central region R1 is reversed.

The inflection point of the Gompertz curve is set as the end position (coating end position) of the electrode active material X. When the change of the right coating end position when the control of the left gap G1 and the control of the right gap G2 are performed is defined as $dW_r$ and the change of the left coating end position is defined as $dW_l$, $dW_r$ and $dW_l$ are represented by the following Expressions (8) and (9).

$$dW_r = KW_{rr} \cdot dG_r + KW_{rl} \cdot dG_l \tag{8}$$

$$dW_l = KW_{lr} \cdot dG_r + KW_{ll} \cdot dG_l \tag{9}$$

In Expressions (8) and (9), $dG_r$ denotes the change amount of right gap controlled [μm], $dG_l$ denotes the change amount of left gap controlled [μm], $KW_{rr}$ denotes a process gain [mm/μm] of the change of the right coating end position due to the change of the right gap controlled, $KW_{rl}$ denotes a process gain [mm/μm] of the change of the right coating end position due to the change of the left gap controlled, $KW_{lr}$ denotes a process gain [mm/μm] of the change of the left coating end position due to the change of the right gap controlled, and $KW_{ll}$ denotes a process gain [mm/μm] of the change of the left coating end position due to the change of the left gap controlled.

Expressions (8) and (9) represent that the changes of the left and right coating end positions when the control of the left gap G1 and the control of the right gap G2 are simultaneously performed can be shown as the superimposition of the changes of the left and right coating end positions when the control of the left gap G1 and the control of the right gap G2 are independently performed and linearity is established therein.

Next, it can be seen through experiments that a proportional relationship is established between the pump rotation speed and the change amount of the coating end position. Accordingly, the change amount of the left coating end position is a value obtained by multiplying the change amount of the left coating end position per unit change of the pump rotation speed by a change amount of pump rotation speed actually controlled. The change amount of the right coating end position is a value obtained by multiplying the change amount of the right coating end position per unit change of the pump rotation speed by the change amount of pump rotation speed actually controlled.

Therefore, when the change of the right coating end position when the pump rotation speed is operated is defined as $dW_r$ and the change of the left coating end position is defined as $dW_l$, $dW_r$ can be modeled by the following Expression (10) and $dW_l$ can be modeled by the following Expression (11).

$$dW_r = KW_{rP} \cdot dP \tag{10}$$

$$dW_l = KW_{lP} \cdot dP \tag{11}$$

In Expressions (10) and (11), dP denotes the change amount of pump rotation speed controlled [%], $KW_{rP}$ denotes a process gain [mm/%] of the change of the right coating end position due to the change of the pump rotation speed controlled, and $KW_{lP}$ denotes a process gain [mm/%] of the change of the left coating end position due to the change of the pump rotation speed controlled.

To summarize the above-mentioned description, the relationships between the simultaneous control of the left gap G1 and the right gap G2 and the average coating weight and the coating width of the central region R1 are described in Table 1. That is, when the left gap G1 and the right gap G2 are simultaneously enlarged (+), the average coating weight increases and the coating width decreases. On the other hand, when the left gap G1 and the right gap G2 are simultaneously narrowed (−), the average coating weight decreases and the coated width increases. The coating width refers to a distance between the left and right coating end positions.

TABLE 1

|  | weight | Coating width |
|---|---|---|
| Operation amount+ | + | − |
| Operation amount− | − | + |

The relationships between the pump rotation speed and the average coating weight and the coating width of the central region R1 are described in Table 2. That is, when the pump rotation speed is increased (+), both the average coating weight and the coating width increase. When the pump rotation speed is decreased (−), both the average coating weight and the coated width decrease.

TABLE 2

|  | weight | Coating width |
|---|---|---|
| Operation amount+ | + | + |
| Operation amount− | − | − |

The positions of the inflection points in the Gompertz curves are generally different from the precise end positions of the electrode active material X. Accordingly, the precise end positions of the electrode active material X may be measured in advance by the end position measuring apparatus 8b, the differences between the positions of the inflection points and the actual end positions may be calculated, and the end positions may be corrected using the differences.

Figure 7:
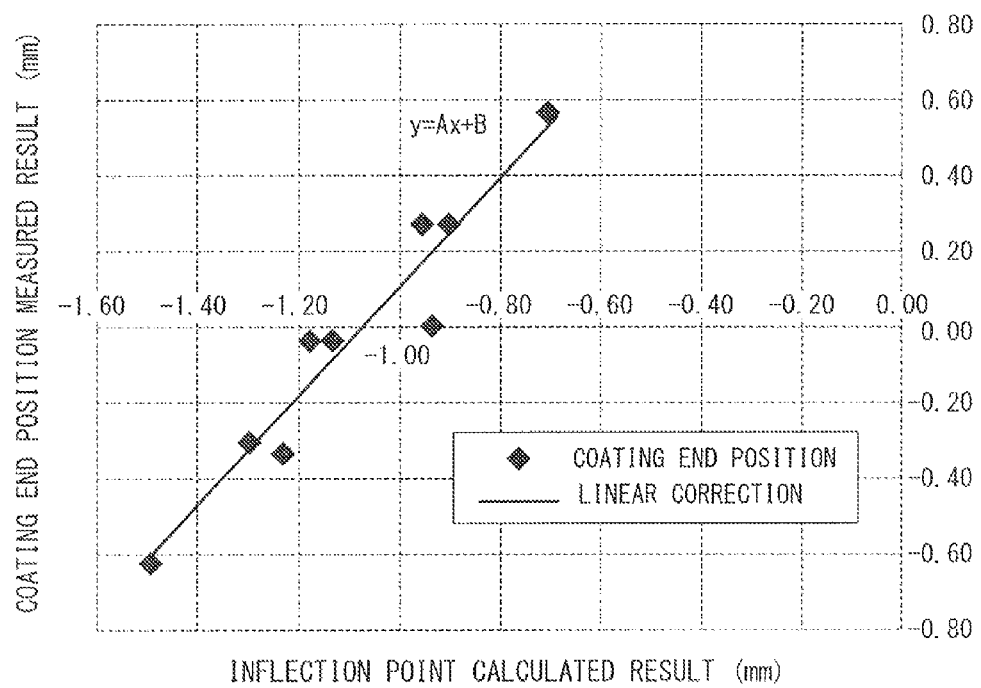
FIG. 7 is a relationship diagram showing a relationship between positions of inflection points acquired by a calculation and results acquired by actual width measurement.

For example, when the relationships between the inflection point positions calculated using Expression (7) and the actually-measured coating end positions are distributed as shown in FIG. 7, a linear graph is derived using linear interpolation or the like and a linear function (the following Expression (12)) representing the linear graph is calculated in advance. By correcting the value calculated from Expression (7) using the linear function, a value closer to an actual value can be obtained.

$$\text{(Measured result of coating end position)}=A\times(\text{Calculated result of inflection point position})+B[\text{mm}] \quad (12)$$

From the above-mentioned point of view, the control system 10 according to the first embodiment divides the surface profile of the electrode active material X into the central region R1 and the rising regions R2, models the central region R1 using a central region model which is represented by a linear function, and models the rising regions R2 using an end region model which is represented by a function depicting the Gompertz curve. The control system 10 according to the first embodiment calculates a calculated profile using the central region model and the end region model, compares the calculated profile with a set value (set profile), and adjusts the left gap G1, the right gap G2, and the pump rotation speed based on the comparison result such that the actual coating profile matches the set value.

Figure 8:
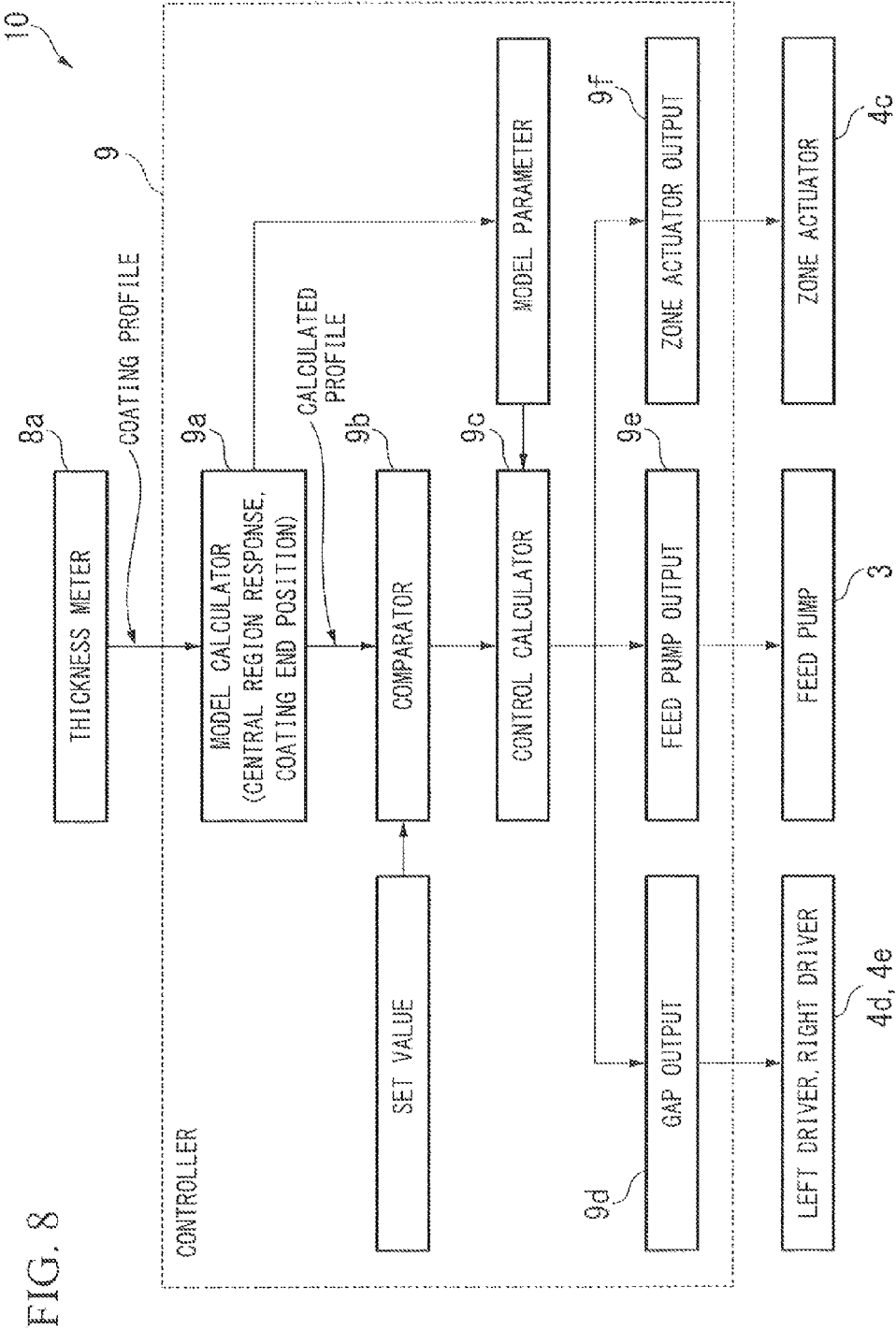
FIG. 8 is a functional block diagram showing the control system according to the embodiment of the present invention.

FIG. 8 is a block diagram showing the control system 10 according to the first embodiment. As described above, the end position measuring apparatus 8b is not shown in FIG. 8, because the end position measuring apparatus 8b is used for an auxiliary purpose of acquiring a corrected value. The controller 9 of the control system 10 according to the first embodiment is constituted by a computer including a memory and a CPU and stores a control program for controlling the coating conditions of the electrode active material X, or the like. The central region model and the end region model are stored as a part of the control program in the controller 9. The controller 9 stores Expressions (1) to (6) as the central region model and stores Expressions (7) to (10) as the end region model. As shown in FIG. 8, the controller 9 functions as a model calculator 9a (model calculator), a comparator 9b (comparator), a control calculator 9c (control calculator), a gap output 9d (gap adjuster), a feed pump output 9e (rotation speed adjuster), and a zone actuator output 9f (zone actuator adjuster).

When the coating profile of the electrode active material X measured by the thickness meter 8a is input, the model calculator 9a of the controller 9 first calculates a calculated profile of the electrode active material X based on the end region model and the central region model. Here, the slope and the average value of the central region R1, the end positions (inflection point positions on the Gompertz curves) of the right and left rising regions R2, and the coating profiles of the zones corresponding to the zone actuators 4c are calculated as values indicating the calculated profile. When the operational expression for correction represented by Expression (12) is stored in the controller 9, the model calculator 9a corrects the end positions of the rising regions R2.

Subsequently, the comparator 9b of the controller 9 compares a predetermined set value with the value indicating the calculated profile obtained through the calculation of the model calculator 9a and calculates a difference therebetween. In addition, the control calculator 9c of the controller 9 calculates operation amounts of the left gap G1, the right gap G2, and pump rotation speed (control amounts) based on the difference which is the comparison result by the comparator 9b. The operation amounts are converted into electrical signals by the gap output 9d, the feed pump output 9e, and the zone actuator output 9f. The gap output 9d adjusts the left gap G1 and the right gap G2 by inputting the operation amounts, which have been converted into the electrical signals, to the left driver 4d and the right driver 4e of the die coater 4 to drive the left driver 4d and the right driver 4e. The feed pump output 9e adjusts the rotation speed of the feed pump 3 by inputting the operation amount, which has been converted into the electrical signal, to the feed pump 3. The zone actuator output 9f adjusts the amounts of electrode active material X ejected from each zone actuator 4c by inputting the operation amounts, which have been converted into the electrical signals, to each zone actuator 4c.

By repeatedly performing these operations (control method), the control system 10 feedback-controls the feed pump 3, each zone actuator 4c, the left driver 4d, and the right driver 4e such that the slope and the average value of the central region R1, the end positions (the inflection point positions on the Gompertz curves) of the right and left rising regions R2, and the coating profile in each zone corresponding to each zone actuator 4c match the set values.

In the battery sheet electrode manufacturing apparatus 1 having the above-mentioned configuration, three patterns shown in Table 3 are present as a specific control method in the control system 10.

TABLE 3

| Pattern | Measurement | Control target | Operation end |
|---|---|---|---|
| I | Thickness meter | Average coating weight Coating width | Gap (simultaneous) Pump rotation speed |
| II | Thickness meter | Slope and intercept of central region and coating end positions in calculated profile | Gap (independent) Pump rotation speed |
| III | Thickness meter | Slope and intercept of central region and coating end positions in calculated profile Coating profile | Gap (independent) Pump rotation speed Zone actuator |

(Pattern I)

Figure 9:
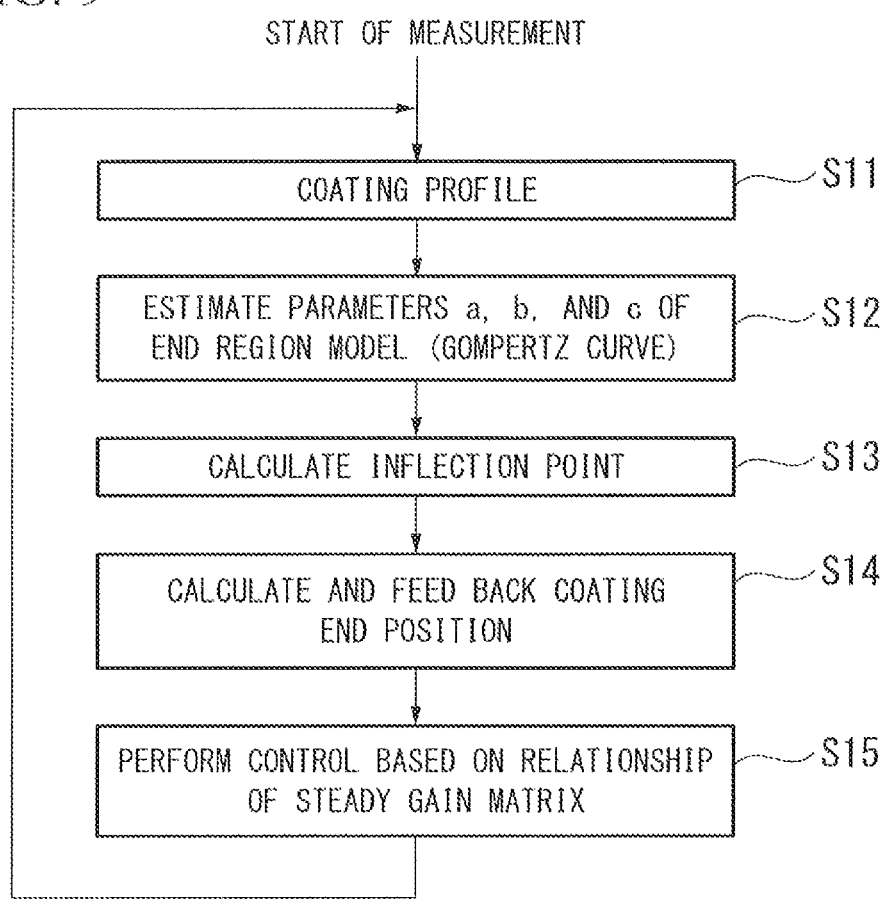
FIG. 9 is a control flow in Pattern I.

FIG. 9 shows a control flow of Pattern I. The controller 9 first acquires a coating profile (coating weight distribution) from the thickness meter 8a (step S11) and subsequently estimates the parameters (parameters a, b, and c included in Expression (7)) included in the end region model (step S12).

When the coating profile (coating weight distribution) in the rising region R2 is defined as p(k), a deviation e(k) from the end region model $y_b(k)$ (Gompertz curve) and a square deviation function J are defined as the following Expressions (13) and (14). Here, k=−n, −n+1, . . . , −1, 0, 1, . . . , n−1, n denotes a total of 2n+1 data sample points.

$$e(k) := p(k) - y_b(k) \tag{13}$$

$$J = \sum_{k=1}^{N} e(k)^2 \tag{14}$$

The parameters a, b, and c included in $y_b(k)$ are estimated using the steepest descent method so as to minimize the function J (that is, to minimize the deviation between the coating profile (coating weight distribution) and the end region model). The parameters are represented as vectors in the following Expression (15).

$$x = [a, b, c]^T \tag{15}$$

In this case, the gradient vector of J is calculated by the following Expression (16).

$$\nabla J = \frac{\partial J}{\partial x} = \begin{bmatrix} -2a^{-1} \sum_{k=1}^{N} y(k) e(k) \\ -2b^{-1} \sum_{k=1}^{N} \exp(-c \cdot k) y(k) e(k) \\ -\ln b \sum_{k=1}^{N} (-2 \cdot k) \exp(-c \cdot k) y(k) e(k) \end{bmatrix} \tag{16}$$

By using Expression (16), renewal rules of Expression (15) minimizing the function J based on the steepest descent method are represented by the following Expressions (17) and (18). $\chi_s$ denotes an estimated value of the parameter which is obtained through the s-th repeated calculation.

$$x_{s+1} = x_s - \frac{1}{2} \gamma \cdot \nabla J \tag{17}$$

$$\gamma = \mathrm{diag}(\gamma_a, \gamma_b, \gamma_c) \tag{18}$$

Here, $\gamma_a$, $\gamma_b$, and $\gamma_c$ are step widths and are small positive constants for determining to what extent the parameters are updated through each repetition. These parameters serve as tuning parameters in using the steepest descent method.

Subsequently, as shown in FIG. 9, the controller 9 calculates the inflection point (step S13). In calculating the inflection point from the end region model $y_b(k)$, the following Expression (19) is obtained by second-order differentiation of $y_b(k)$ with respect to k.

$$\frac{d^2 y_b(k)}{dk^2} = a \cdot (-c)^2 \cdot \ln b \cdot \{b^{\exp(-c \cdot k)} \cdot \exp(-c \cdot k) \cdot (\ln b \cdot \exp(-c \cdot k) + 1)\} \tag{19}$$

The value of k with which the right side of Expression (19) is zero is the x coordinate value of the inflection point. Since $b^{\exp(-c \cdot k)} > 0$ and $\exp(-c \cdot k) > 0$ are established from the characteristics of an exponential function, the value of k satisfying the following Expression (20) is the x coordinate value of the inflection point.

$$\ln b \cdot \exp(-c \cdot k) + 1 = 0 \tag{20}$$

The inflection point $(k_v, y_{b\_v})$ may finally be calculated by the following Expression (21) from Expression (20).

$$(k_v, y_{b\_v}) = \left( \frac{1}{c} \ln(-\ln b), \frac{a}{\exp(1)} \right) \tag{21}$$

Subsequently, as shown in FIG. 9, the controller 9 calculates and feeds back the coating end positions (step S14) and performs control based on relationships in a steady gain matrix (step S15).

In Pattern I, the operation amounts include the simultaneous operation amount of gap dG and the operation amount of pump rotation speed dP and the control amounts include the change dA of the average coating weight and the change of the coating width dW. The coating width is a distance between the right and left coating end positions and is calculated as $dW = dW_l - dW_r$. The relationship of the following Expression (22) is established between the operation amounts and the control amounts. Here, $l_{1,1}$ to $l_{2,2}$ denote steady gains (process gains) from each operation amount to the control amounts. The matrix of Expression (22) including $l_{1,1}$ to $l_{2,2}$ is referred to as a steady gain matrix.

$$\begin{bmatrix} dW \\ dA \end{bmatrix} = \begin{bmatrix} l_{1,1} & l_{1,2} \\ l_{2,1} & l_{2,2} \end{bmatrix} \begin{bmatrix} dG \\ dP \end{bmatrix} \tag{22}$$

In consideration of the relationships of $dG_r = dG_l = dG$ and $dW = dW_l - dW_r$ which are established when the simultaneous control of the right and left gaps is performed in Expressions (4), (8), (9), (10), and (11), the steady gain matrix is represented by the following Expression 23.

$$\begin{bmatrix} dW \\ dA \end{bmatrix} = \begin{bmatrix} (KW_{lr} + KW_{ll}) - (KW_{rr} + KW_{rl}) & KW_{lp} - KW_{rp} \\ K_g & K_p \end{bmatrix} \begin{bmatrix} dG \\ dP \end{bmatrix} \tag{23}$$

The condition number which is an index for determining a control algorithm is defined as a ratio of the maximum singular value and the minimum singular value of the steady gain matrix. When the condition number is greater than 50, a control law using an inverse matrix like the least square law is not suitable. In this case, a control algorithm using the steepest descent method associated with the sum of squares of control deviations is effectively used.

The gap G, the pump rotation speed P, the weight A, and the coating width W are expressed in vectors and then the following Expression (24) is obtained.

$$z=[GP]^T, C_{PV}=[WA]^T \quad (24)$$

At this time, the following Expression (25) is obtained by integrating Expression (22).

$$C_{PV}=L_l \cdot z + C_{ini} \quad (25)$$

$L_l$ denotes the steady gain matrix of Expression (22) and Expression (26) denotes the initial values of the weight and the coating width.

$$C_{ini}=[W_{ini} A_{ini}]^T \quad (26)$$

The set values of the weight and the coating width are defined as in Expression (27) and a deviation $C_{DV}$ from $C_{PV}$ is defined by the following Expression (28).

$$C_{SV}=[W_{SV} A_{SV}]^T \quad (27)$$

$$C_{DV} := C_{PV} - C_{SV} = [W - W_{SV} A - A_{SV}]^T \quad (28)$$

When an evaluation function $J_c$ is a square deviation function, $J_c$ may be calculated by the following Expression (29) using the relationship of Expression (25).

$$\begin{aligned} J_c &= \sum_{i=1}^{2} C_{DV}(i)^2 \\ &= C_{DV}^T \cdot C_{DV} \\ &= (L_l \cdot z)^T \cdot (L_l \cdot z) + 2 \cdot (L_l \cdot z)^T \cdot (C_{ini} - C_{SV}) + \\ &\quad (C_{ini} - C_{SV})^T \cdot (C_{ini} - C_{SV}) \end{aligned} \quad (29)$$

Accordingly, the gradient vector of $J_c$ is calculated by the following Expression (30).

$$\begin{aligned} \nabla J_c &= \frac{\partial J_c}{\partial z} \\ &= 2 \cdot L_l^T \cdot (L_l \cdot z) + 2 \cdot L_l^T \cdot (C_{ini} - C_{SV}) \\ &= 2 \cdot L_l^T \cdot (C_{PV} - C_{ini}) + 2 \cdot L_l^T \cdot (C_{ini} - C_{SV}) \\ &= 2 \cdot L_l^T \cdot (C_{PV} - C_{SV}) \\ &= 2 \cdot L_l^T \cdot C_{DV} \end{aligned} \quad (30)$$

Therefore, the renewal rule of z that minimizes $J_c$ based on the steepest descent method is represented by the following Expressions (31) and (32) using Expression (30).

$$z_{s+1} = z_s - \frac{1}{2} \varepsilon \cdot \nabla J_c \quad (31)$$

$$\varepsilon = \mathrm{diag}(\varepsilon_G, \varepsilon_P) \quad (32)$$

Here, $\varepsilon_G$ and $\varepsilon_P$ denote step widths. Expressions (31) and (32) which are finally obtained are the control law using the steepest descent method.

(Pattern II)

Figure 10:
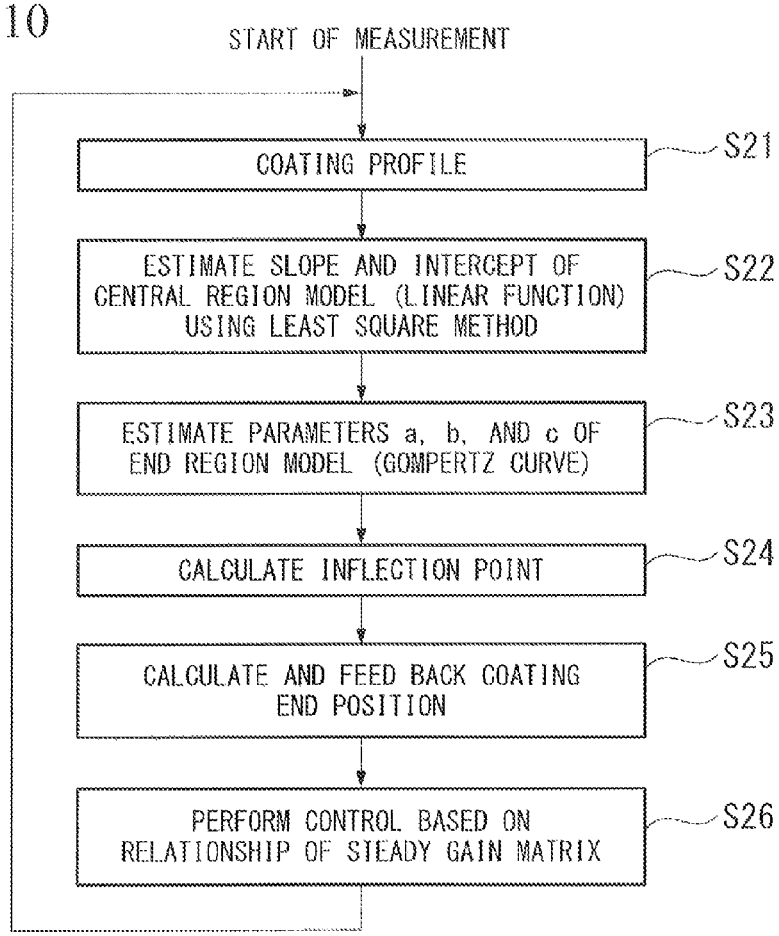
FIG. 10 is a control flow in Pattern II.

FIG. 10 shows a control flow of Pattern II. The controller 9 first acquires a coating profile (coating weight distribution) from the thickness meter 8a (step S21) and subsequently estimates the slope and the intercept of the central region model (step S22). Subsequently, as in Pattern I, the controller 9 estimates the parameters included in the end region model (step S23), calculates the inflection point (step S24), and calculates and performs feeds back the coating end positions (step S25).

Subsequently, the controller 9 performs control based on relationships in a steady gain matrix (step S26). In Pattern II, the following Expression (33) is established in which the operation amounts include the operation amounts of right and left gaps $dG_r$ and $dG_l$ and the operation amount of pump rotation speed dP and the control amounts include the slope dS of the central region, the intercept dB of the central region R1, and the right and left coating end positions of the coaters in m-line coating.

$$dW_{jr}, dW_{jl}(j=1,\ldots,m) \quad (33)$$

The following Expression (34) is obtained from Expressions (1) to (3).

$$y_c(i) = y_r(i) + y_l(i) = \frac{i}{(1-\alpha)N}(K_r \cdot dG_r - K_l \cdot dG_l) + \quad (34)$$
$$\frac{-\alpha N}{(1-\alpha)N} K_r \cdot dG_r + \frac{(1-\alpha)N+1}{(1-\alpha)N} K_l \cdot dG_l$$

The steady gain matrix is expressed by the following Expression (35) from the relationships of Expressions (34) and (4) and Expressions (8) to (11).

$$\begin{bmatrix} dS \\ dB \\ dW_{1r} \\ dW_{1l} \\ \vdots \\ dW_{mr} \\ dW_{ml} \end{bmatrix} = \begin{bmatrix} \frac{K_r}{(1-\alpha)N} & \frac{-K_l}{(1-\alpha)N} & 0 \\ -\frac{\alpha N \cdot K_r}{(1-\alpha)N} & \frac{((1-\alpha)N+1) \cdot K_l}{(1-\alpha)N} & K_p \\ KW_{1rr} & KW_{1rl} & KW_{1rp} \\ KW_{1lr} & KW_{1ll} & KW_{1lp} \\ \vdots & \vdots & \vdots \\ KW_{mrr} & KW_{mrl} & KW_{mrp} \\ KW_{mlr} & KW_{mll} & KW_{mlp} \end{bmatrix} \begin{bmatrix} dG_r \\ dG_l \\ dP \end{bmatrix} \quad (35)$$

Since the condition number increases, the steepest descent method is effectively used as the control algorithm.

Figure 11:
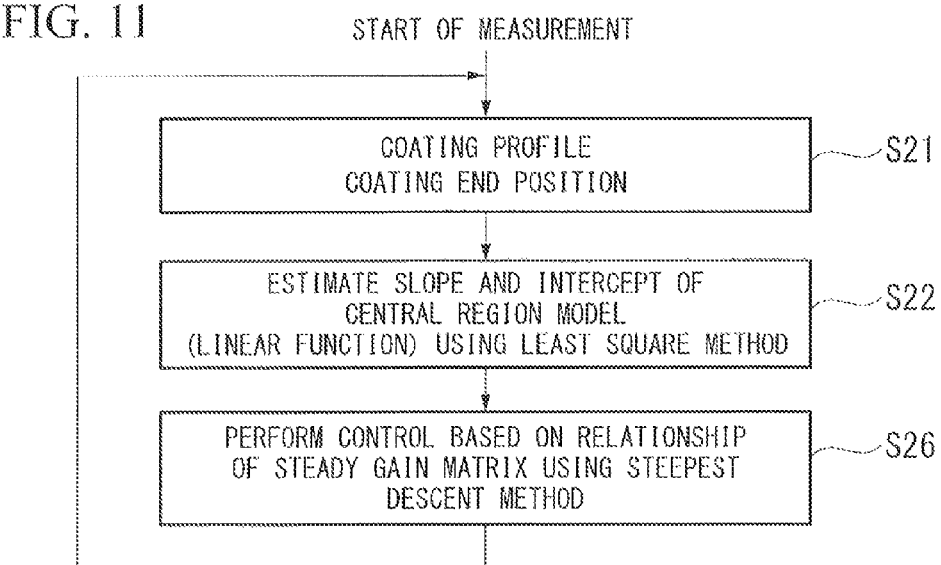
FIG. 11 is a control flow in a variation of Pattern II.

When the end position measuring apparatus 8b is used, steps S23 to S25 may be omitted by acquiring the coating end positions in step S21 as shown in the control flow of FIG. 11.

(Pattern III)

When the surface profile of the electrode active material X is more finely adjusted by additionally controlling the zone actuators 4c to adjust the amount of electrode active material X ejected for each zone, operation amounts of the zone actuators $\Delta z_1$ to $\Delta z_v$ (where v is the number of zones) as additional operation amounts and changes of the coating profiles $\Delta ZP_1$ to $\Delta ZP_v$ of the zones as additional control amounts are added to Pattern II. Accordingly, the steady gain matrix is represented by the following Expression (36).

$$\begin{bmatrix} dS \\ dB \\ dW_{1r} \\ \vdots \\ dW_{ml} \\ \hline dZ_1 \\ \vdots \\ dZ_v \end{bmatrix} = \begin{bmatrix} \frac{K_r}{(1-\alpha)N} & \frac{-K_l}{(1-\alpha)N} & 0 & l_{1,4} & \cdots & \cdots & \cdots & l_{1,v+3} \\ -\frac{\alpha N \cdot K_r}{(1-\alpha)N} & \frac{((1-\alpha)N+1)\cdot K_l}{(1-\alpha)N} & K_p & l_{2,4} & \cdots & \cdots & \cdots & l_{2,v+3} \\ KW_{1rr} & KW_{1rl} & KW_{1rp} & l_{3,4} & \cdots & \cdots & \cdots & l_{3,v+3} \\ \vdots & \vdots & \vdots & \vdots & \ddots & \ddots & \ddots & \vdots \\ KW_{mlr} & KW_{mll} & KW_{mlp} & l_{2m+2,4} & \cdots & \cdots & \cdots & l_{2m+2,v+3} \\ \hline l_{2m+3,1} & l_{2m+3,2} & l_{2m+3,3} & l_{2m+3,4} & \cdots & \cdots & \cdots & l_{2m+3,v+3} \\ \vdots & \vdots & \vdots & \vdots & \ddots & \ddots & \ddots & \vdots \\ l_{2m+2+v,1} & l_{2m+2+v,2} & l_{2m+2+v,3} & l_{2m+2+v,4} & \cdots & \cdots & \cdots & l_{2m+2+v,v+3} \end{bmatrix} \begin{bmatrix} dG_r \\ dG_l \\ dP \\ \hline \frac{dP}{dz_1} \\ \vdots \\ dz_v \end{bmatrix} \quad (36)$$

In Expression (36), $l_{1,4}$ to $l_{2m+2,v+3}$ are acquired by analyzing the response of the central region R1 to the operations of the zone actuators 4c and the changes of the coating end positions. In addition, $l_{2m+3,1}$ to $l_{2m+2+v,3}$ are acquired by analyzing the change of the coating profile for each zone due to the independent controls of the left gap G1 and the right gap G2 or the operation of the pump rotation speed. In addition, $l_{2m+3,4}$ to $l_{2m+2+,+3}$ are acquired by analyzing the change of the coating profile for each zone due to the operations of the zone actuators.

In Pattern III, since the condition number increases, the steepest descent method is effectively used as the control algorithm.

Figure 12A:
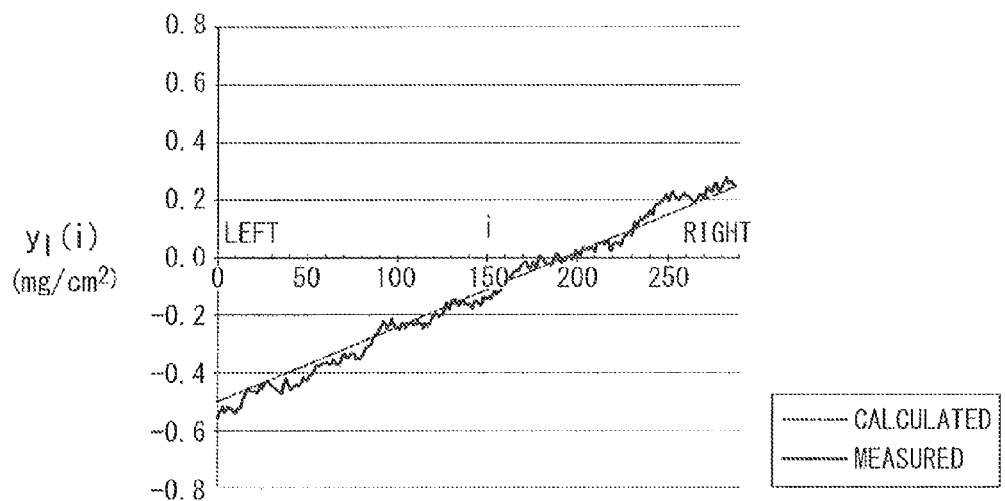
FIG. 12A is a graph showing responses in the calculated result of a control system according to a first embodiment and the actual measured result when the control of the left gap is independently performed.
Figure 12B:
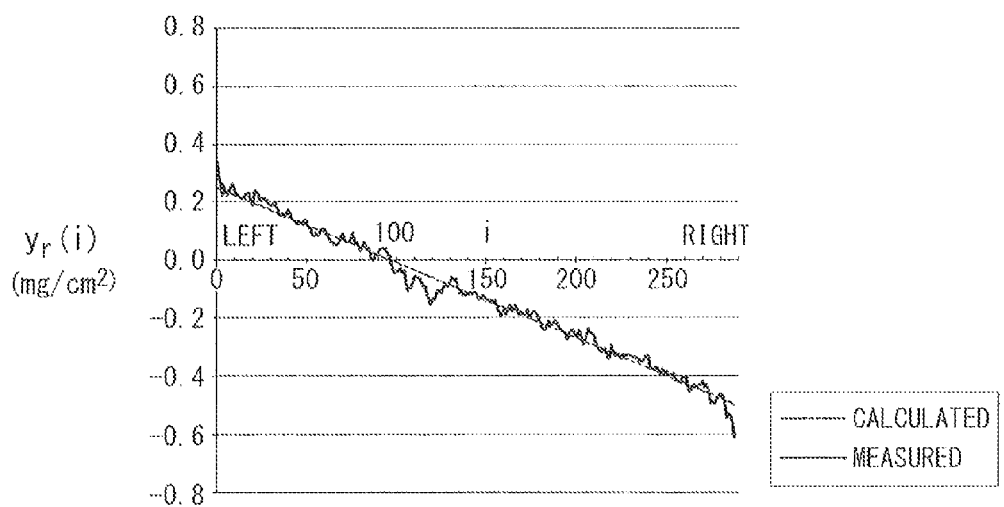
FIG. 12B is a graph showing responses in the calculated result of the control system according to the first embodiment and the actual measured result when the control of the right gap is independently performed.

Subsequently, the result of comparison of the calculated profile acquired in the control system 10 according to the first embodiment and the actually-measured coating profile is shown in FIGS. 12A and 12B. FIG. 12A shows a response when the control of the left gap G1 is independently performed and FIG. 12B shows a response when the control of the right gap G2 is independently performed. As shown in FIGS. 12A and 12B, it could be confirmed that the calculated profile acquired by calculation and the coating profile acquired by measurement substantially match.

Figure 12C:
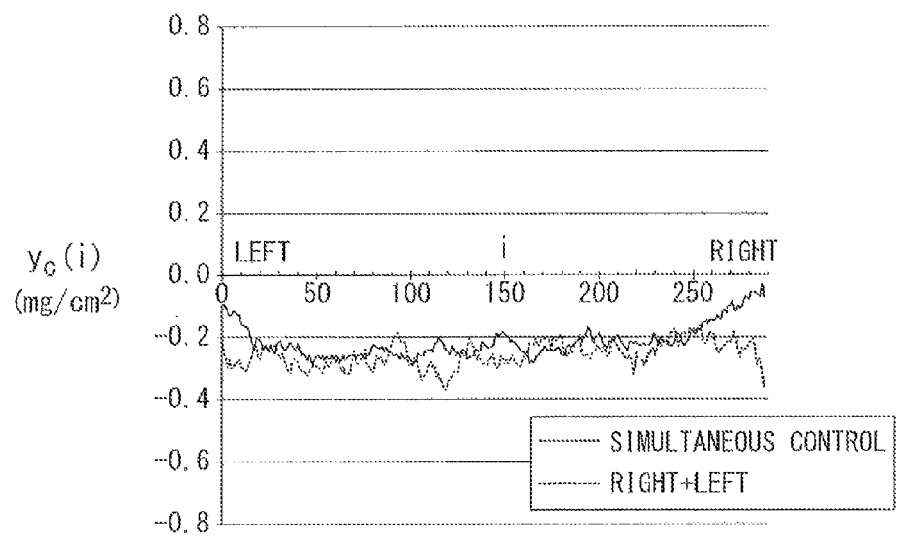
FIG. 12C is a graph showing test results when the control of the right gap and the control of the left gap are independently performed and when the simultaneous control of both gaps is performed.

As shown in FIG. 12C, as the results of tests performed when the control of the left gap G1 and the control of the right gap G2 are independently performed (right+left) and when the simultaneous control of both gaps is performed (simultaneous control), the coating profiles substantially match.

Figure 13:
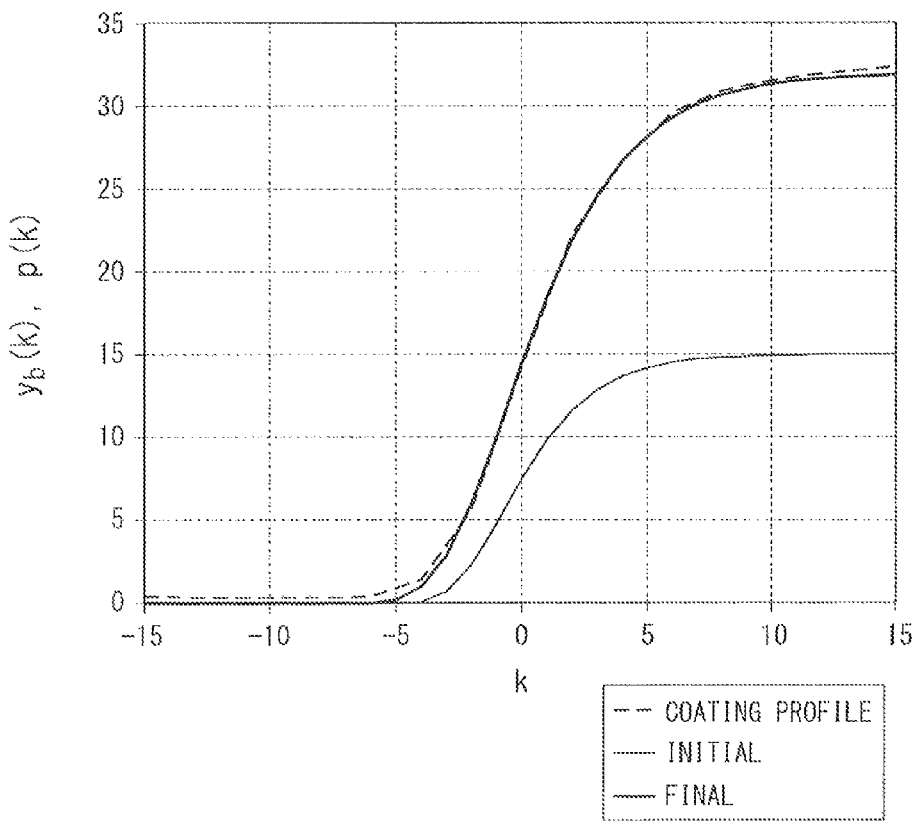
FIG. 13 is a graph showing results of 500 calculations using a steepest descent method after appropriate initial values are given to parameters of an end region model.

As shown in FIG. 13, the results of 500 calculations using the steepest descent method after appropriate initial values are given to the parameters a, b, and c in Expression (7) substantially matches the actually-measured coating profile of the rising region R2.

In the above-mentioned control system 10 (control method) according to the first embodiment, the calculated profile is acquired by performing calculation using the end region model and the central region model, the difference (that is, comparison result) from the set value is acquired by comparing the calculated profile acquired by calculation with the set profile (set value), and the gap between the die coater 4 and the collector Y and the rotation speed of the feed pump 3 are adjusted based on the difference. Accordingly, it is possible to optimize the surface profile of the electrode active material X in the width direction of the collector Y (to match the set profile) in coating the collector Y with the electrode active material X.

In the control system 10 according to the first embodiment, the model calculator 9a of the controller 9 calculates the end positions of the electrode active material X based on the end region model and the comparator 9b compares the end positions of the set profile with the end positions calculated by the model calculator 9a. Accordingly, it is possible to satisfactorily optimize the end positions of the electrode active material X and thus to optimally control the coating end positions of the electrode active material X. In this case, it is possible to control the coating end positions of the electrode active material X without using the end position measuring apparatus 8b. Here, when the end position measuring apparatus 8b is used, it can be expected to realize higher-accuracy control.

The control system 10 according to the first embodiment employs the configuration in which the right and left gaps in the width direction of the collector Y can be independently adjusted. In the control system 10 according to the first embodiment employing this configuration, as described above, it is possible to adjust the inclination of the central region R1 in addition to the end positions and thus to adjust the average of coating weights (average coating weight). Accordingly, the model calculator 9a can optimize the end positions, the inclination of the central region R1, and the average coating weight by calculating these values as values indicating the calculated profile.

In the control system 10 according to the first embodiment, the central region model is expressed by a linear function. Accordingly, it is possible to easily calculate the central region model in a short time.

When the end positions acquired by calculation are corrected based on the end positions of the electrode active material X acquired by measurement as described above, it is possible to acquire values closer to the actual end positions of the electrode active material X as the calculated result. Since this correction is linear correction, it is possible to acquire the actually-coated end positions of the electrode active material X.

In the control system 10 according to the first embodiment, the amount of electrode active material X ejected in the width direction of the collector Y can be adjusted by controlling the arranged zone actuators 4c. Accordingly, it is possible to more finely adjust the profile of the central region R1 by performing the control of Pattern III.

In the control system 10 according to the first embodiment, the control amounts are acquired using the steepest descent method associated with the sum of squares of control deviations in the width direction. Accordingly, even when the condition number is great, it is possible to appropriately derive the control amounts.

In the control system 10 according to the first embodiment, the end region model is expressed by the function indicating the Gompertz curve. Accordingly, it is possible to substantially match the actual profile of the rising region R2 with the profile of the rising region R2 acquired by calculation and thus to more accurately control the surface profile of the electrode active material X.

In the control system 10 according to the first embodiment, the parameters a, b, and c included in the function indicating the Gompertz curve are calculated using the steepest descent method associated with the square deviation of the calculated profile of the rising region R2 acquired using the end region model and the measured profile of the rising region R2, and the profile of the rising region R2 is calculated based on the function indicating the Gompertz curve using the parameters a, b, and c. Accordingly, for example, as shown in FIG. 13, the profile of the rising region R2 acquired by calculation can be corrected to the profile of the rising region R2 closer to the measured profile and it is thus possible to more accurately control the surface profile of the electrode active material X.

In the control system 10 according to the first embodiment, the inflection point of the Gompertz curve is calculated as the end position. Since only one inflection point is present in the Gompertz curve, it is possible to easily and surely determine the end position.

While the preferred embodiment of the aspect of the present invention has been described above with reference to the accompanying drawings, the present invention is not limited to the first embodiment. The shapes or the combinations of the constituent members in the first embodiment are only examples and can be modified in various forms depending on design requirements without departing from the gist of the present invention.

For example, in the first embodiment, the control system and the control method according to the aspect of the present invention are applied to the control in coating the collector Y with the electrode active material X. However, the present invention is not limited to this embodiment and is applicable to general control in coating a substrate with a paste-like coating material. For example, the present invention is applicable to control in producing a film by coating a substrate with a paste-like resin.

The first embodiment employs the configuration in which the end region model is expressed by the function indicating the Gompertz curve. However, the present invention is not limited to this configuration and may employ a configuration in which the end region model is expressed by a function indicating a curve having an inflection point instead of the Gompertz curve. The present invention may employ a configuration in which the end region model is expressed by a function indicating a curved line not having an inflection point.

In the first embodiment, the end positions of the electrode active material X calculated by the model calculator 9a may be replaced with the measured result by the end position measuring apparatus 8b. For example, when the measurement accuracy of the end position measuring apparatus 8b is higher than the accuracy of the calculated result by the model calculator 9a, it is possible to more accurately acquire the end positions of the electrode active material X by employing this configuration.

In the first embodiment, the configuration in which the control system 10 includes the thickness meter 8a has been described. However, the present invention is not limited to this configuration, thus the calculated profile may be acquired from the coating profile acquired outside the control system 10 using the central region model and the end region model. In this case, a configuration not including the thickness meter 8a may be employed.

In the first embodiment, the configuration has been described in which both the gap between the die 4b and the collector Y and the rotation speed of the feed pump 3 are controlled based on the calculated profile acquired by the model calculator 9a. However, the present invention is not limited to this configuration and may employ a configuration in which one of the gap between the die 4b and the collector Y and the rotation speed of the feed pump 3 is controlled based on the calculated profile acquired by the model calculator 9a. Even when only one of the gap between the die 4b and the collector Y and the rotation speed of the feed pump 3 is adjusted as described above, it is possible to adjust the coating profile.

REFERENCE SIGNS LIST

1 Battery sheet electrode manufacturing apparatus
2 Raw material tank
3 Feed pump (pump)
4 Die coater
4a Pedestal
4b Die (nozzle)
4b1 Slit
4c Zone actuator
4d Left driver
4e Right driver
5 Backup roll
6 Drying oven
7 Winder
8 Measure
8a Thickness meter
8b End position measuring apparatus (end position measure)
9 Controller
9a Model calculator (model calculator)
9b Comparator (comparator)
9c Control calculator (control calculator)
9d Gap output (gap adjuster)
9e Feed pump output (rotation speed adjuster)
9f Zone actuator output (zone actuator adjuster)
10 Control system
G1 Left gap
G2 Right gap
R1 Central region
R2 Rising region
R3 Intermediate region
X Electrode active material (coating material)
Y Collector (substrate)

The invention claimed is:

1. A control system, comprising:
a gap adjuster configured to adjust a gap between a nozzle for ejecting a coating material and a substrate to be coated with the coating material;
a rotation speed adjuster configured to adjust a rotation speed of a pump for pressure-feeding the coating material to the nozzle;
a measurer configured to measure a coating weight distribution of the coating material in a width direction of the substrate;
a model calculator configured to calculate a surface profile of the coating material based on the coating weight distribution measured by the measurer, an end region model, and a central region model, the end region model modeling profiles of rising regions in the surface profile of the coating material in the width direction of the substrate, the central region model modeling a profile of a central region between the rising regions in the surface profile;
a comparator configured to compare a predetermined set profile with the surface profile of the coating material calculated by the model calculator; and a control calculator configured to calculate a control amount of at least one of the gap adjuster and the rotation speed adjuster based on a comparison result of the comparator, wherein the model calculator is configured to calculate end positions of the coating material, a slope of the central region, and an average coating weight of the central region as values indicating the surface profile based on the end region model and the central region model, and the gap adjuster is configured to independently adjust the gap at one end region and the gap at an other end region in the width direction of the substrate to adjust the end positions of the coating material, the slope of the central region, and the average coating weight of the central region based on the surface profile calculated by the model calculator.

2. The control system according to claim 1, wherein the model calculator is configured to calculate the end positions of the coating material based on the end region model, and the comparator is configured to compare end positions of the set profile with the end positions calculated by the model calculator.

3. The control system according to claim 1, wherein the central region model is expressed by a linear function.

4. The control system according to claim 2, wherein the model calculator is configured to correct the end positions of the coating material acquired by calculation based on end positions of the coating material acquired by measurement.

5. The control system according to claim 4, wherein the model calculator is configured to perform linear correction of the end positions of the coating material.

6. The control system according to claim 1, further comprising:

a zone actuator adjuster configured to control zone actuators, the zone actuators being arranged with respect to the nozzle in the width direction of the substrate, each of the zone actuators adjusting an amount of the coating material ejected from the nozzle, wherein the control calculator is configured to calculate control amounts of the gap adjuster, the rotation speed adjuster, and the zone actuator adjuster based on the comparison result of the comparator.

7. The control system according to claim 1, wherein the control calculator is configured to calculate the control amount of the at least one of the gap adjuster and the rotation speed adjuster using a steepest descent method associated with a sum of squares of control deviations.

8. The control system according to claim 1, wherein the end region model is expressed by a function indicating a Gompertz curve.

9. The control system according to claim 8, wherein the model calculator is configured to calculate parameters included in the function indicating the Gompertz curve using a steepest descent method associated with a square deviation of one of the profiles of one of the rising regions calculated based on the end region model and a measured profile of one of the rising regions, and to calculate the profiles of the rising regions based on the function indicating the Gompertz curve using the parameters.

10. The control system according to claim 8, wherein the model calculator is configured to calculate an inflection point of the Gompertz curve as one of the end positions of the coating material, and the comparator is configured to compare the end positions of the predetermined set profile with the end positions calculated by the model calculator.

11. The control system according to claim 2, further comprising:

an end position measure configured to measure actual end positions of the coating material, wherein the end positions of the coating material calculated by the model calculator are replaced with a measured result of the end position measure.

* * * * *